Nov. 8, 1955    B. H. LOCKE    2,723,014
OVERLOAD RELEASE FLEXIBLE COUPLING
Filed Sept. 16, 1953

INVENTOR
Burton H. Locke

United States Patent Office 2,723,014
Patented Nov. 8, 1955

2,723,014

OVERLOAD RELEASE FLEXIBLE COUPLING

Burton H. Locke, Framingham, Mass.

Application September 16, 1953, Serial No. 380,490

1 Claim. (Cl. 192—56)

This invention relates to improvements in overload release flexible couplings of the form that connects a drive and driven member and will release its connection whenever excessive torque, or overload, is imposed on the driven member due generally to excessive loads being imposed on the mechanism being driven. Such a coupling eliminates the possibility of excessive torque being imposed on the machine or mechanism, which is driven through the coupling, that would cause damage to the same.

One object of the invention is to produce a simple mechanism that would be relatively inexpensive to produce and yet is effective in operation and easy to reset after releasing and due to its simplicity requires a minimum of parts and thus a minimum of maintenance requirement.

Another object is to afford a simple means to retain the coupling out of engagement until the overload is removed and it is reset so that the drive member is free to rotate when the driven member is stopped due to the overload being imposed on the same.

Another object is to afford a simple construction that has flexible connection between the drive and driven members so that the coupling can be used to connect shafts that are somewhat out of alignment. Such a construction would serve as a flexible coupling as well as an overload release coupling.

Another object is to provide means to adjust the coupling to meet various overload release requirement so that the coupling can serve for use in varying applications.

Figure 2:
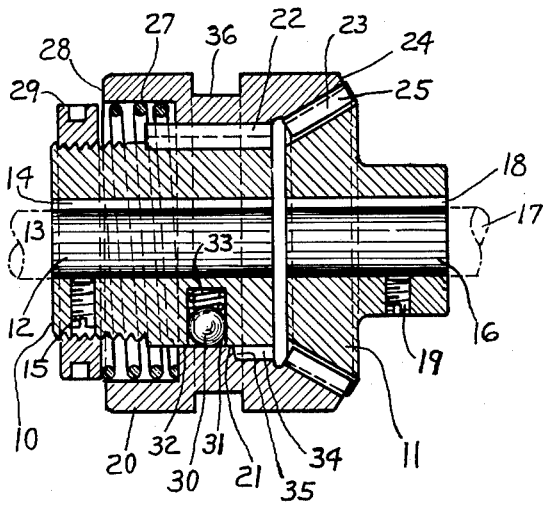
Figure 2 is a sectional elevation of the same taken on line 2—2, of Figure 1.
Figure 1:
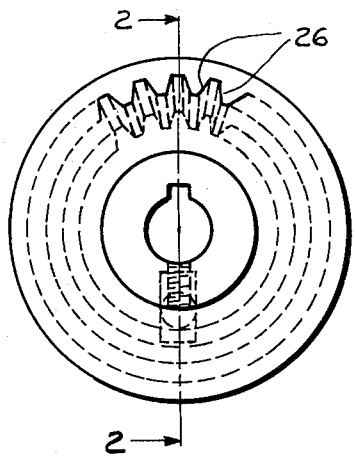
Figure 1 is an end view of my improved coupling in its engaged position.

My improved coupling comprises an annular shaped member 10 and an annular shaped member 11 disposed in axial relationship. Either member could be utilized as the drive member and the other the driven member.

Member 10 has a bore 12 to receive a shaft 13, and a keyway 14 and a set screw 15 are provided for use in rigidly mounting the said member onto the shaft 13.

Member 11 has a bore 16 to receive a shaft 17, that is disposed coaxial to shaft 13, and a keyway 18 and a set screw 19 are provided for use in rigidly mounting the said member onto shaft 17.

A sleeve member 20 is slidably mounted on the peripherial portion 21 of member 10 and is held to rotate therewith by means of a key 22. Key 22 is tightly fitted into member 10 and is slidably fitted in the sleeve member 20.

There are internal inclined teeth 23 on the end 24, of sleeve member 20, that engage similar teeth 25, disposed on the periphery of member 11 to meet the inclination of teeth 23, to effect a coupling intermediate the members 10 and 11. The sides 26 of the mating teeth are inclined so that when a torque is applied intermediate the members 10 and 11 an axial thrust is effected that tends to separate, or divorce, the sleeve member 20 and the member 11.

It is obvioun that the longitudinal inclination of the teeth as well as the inclination of the sides of the teeth have a bearing on the amount of the torque required to be imposed intermediate the members 10 and 11 to cause the separation of the sleeve member 20 and the member 11, and thereby cause the release of the coupling.

Sleeve member 20 is resiliently urged into engagement with member 11 by means of a spring 27 which is housed in, and abuts, the opposite end portion 28 of the said sleeve member. The spring 27 is held in abutment with the sleeve member 20 by means of a nut 29 that has threaded engagement with the periphery 21 of member 10.

The nut 29 can be adjusted along the member 10 to vary the resilient urging effect of spring 27 against sleeve member 20 and thereby cause a variance in the amount of the thrust required to effect the separation of sleeve member 20 and member 11, and resultantly effect control of the amount of torque required to release the coupling.

There is a ball 30 housed in an aperture 31 provided in the periphery 21 of member 10 and resiliently urged outwardly against the bore 32 of sleeve member 20 by a spring 33. A notch 34, which has its inner end 35 inclined to cooperate with ball 30 when the members are separated, is provided in the bore 32 of sleeve member 20.

When the teeth on sleeve member 20 are thrust out of engagement with the teeth on member 11 by axial torque being imposed intermediate the annular members 10 and 11 as hereinbefore explained, the notch 34 is moved to a position opposite the ball 30 and the said ball enters the notch and by contacting the inclined end 35 of the notch forces the said members farther apart. This extra separation of the teeth permits one annular member to rotate while the other annular member is at rest without the teeth on either member, contacting the teeth on the other member, as shown in Figure 3.

Figure 3:
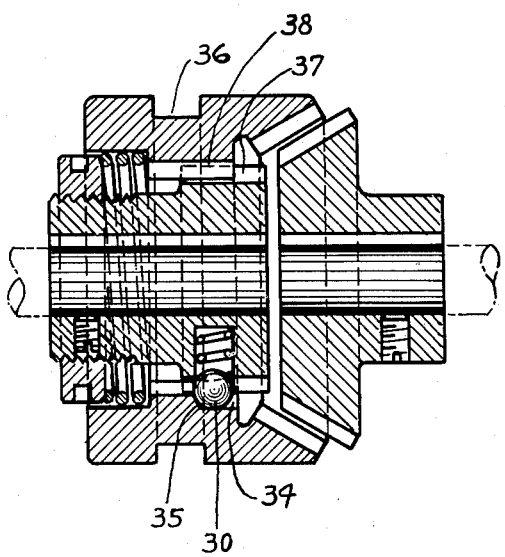
Figure 3 is a similar sectional view to Figure 2 showing a modified form of the invention and in its released position.

The ball 30 will retain the separation of the said members, as shown in Figure 3, until the overload, or excessive torque, is removed and the sleeve member 20 is urged toward the member 11 by some outside force sufficient to cause ball 30 to recede into aperture 31 and the members are rotated to proper position to permit the teeth to become engaged. The said outside force could be applied to sleeve member 20 by means of a shifter fork, or the like, that could be applied to a groove, such as 36, that is provided around the periphery of the sleeve member 20.

Generally both sides 26 of the teeth on sleeve member 20 and member 11 are inclined so that the coupling will be operative in either direction of rotation. Operative clearance is provided between the teeth to permit the members to flex relatively and thereby afford proper operation of the coupling if shafts 13 and 17 were somewhat out of alignment. In other words, the coupling so constructed would serve as a flexible coupling as well as an overload release coupling.

A plurality of splines could be utilized to rotatively connect sleeve member 20 to annular member 10 instead of a single key 22. Furthermore, the said connection could be accomplished by a portion of member 10 being in the form of external gear teeth 37 and a portion of the sleeve member 20 being in the form of internal gear teeth 38, as shown in Figure 3.

Figure 4:
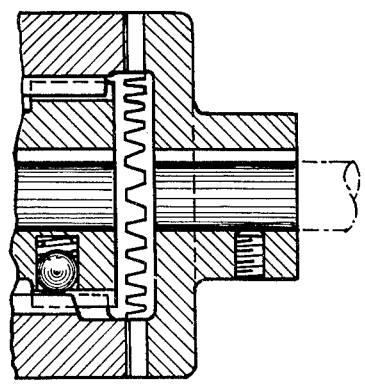
Figure 4 is a fragmental section similar to Figure 2 showing a modification of the invention.

In constructions to serve relative light overload torque requirements the teeth on sleeve member 20 and member 11 could be disposed at right angles to the axis of the members, as shown in Figure 4. The proper angular disposition of the teeth relative to the axis of the members to serve a predetermined torque requirement should be determined in conjunction with the resiliency of spring 27.

I do not wish to be confined to the exact constructions set forth as the same are susceptible to modification within the spirit and scope of the invention.

I claim:

An overload release flexible coupling comprising two annular members arranged coaxially and adjacent to each other, a bore in each said member for mounting the members on coaxial disposed shafts, respectively, a sleeve mounted on one of the two annular members and disposed to slide thereon and to rotate therewith, teeth on the end of said sleeve adjacent the other said annular member, teeth disposed on the other said annular member to engage with the teeth on the said sleeve and thereby effect a coupling of the said members, said teeth being disposed in angular relationship to the axis of the said members, the sides of the said teeth being inclined so that an opposing axial torque imposed on the said members will effect an end thrust that will tend to axially divorce the said sleeve from the other said annular member and thereby tend to release the coupling of the said members, resilient means disposed to urge the said sleeve into its tooth engagement with the other said annular member, means to adjust the said resilient means to vary the opposed torque requirement to effect the said divorce of the member and the sleeve, resilient means to effect a further parting of the said sleeve and the other said member as the same become divorced by an excessive torque being imposed on the members and to hold the same thereapart until the member and the sleeve are remated by some outside force being applied thereto.

References Cited in the file of this patent
UNITED STATES PATENTS

| | | |
|---|---|---|
| 949,179 | Gilbert | Feb. 15, 1910 |
| 1,111,990 | Braun | Sept. 29, 1914 |
| 1,229,570 | Backscheider | June 12, 1917 |
| 1,462,879 | Woodward | July 24, 1923 |
| 1,512,760 | Hancock | Oct. 21, 1924 |
| 1,628,184 | Pestel | May 10, 1927 |
| 1,725,562 | Borchert | Aug. 20, 1929 |
| 1,744,976 | Levedahl | Jan. 28, 1930 |
| 1,821,543 | Coultas | Sept. 1, 1931 |
| 1,919,437 | Le Fevre | July 25, 1933 |
| 1,999,523 | Willoughby | Apr. 30, 1935 |
| 2,412,630 | Nelson | Dec. 17, 1946 |